Figure 1:
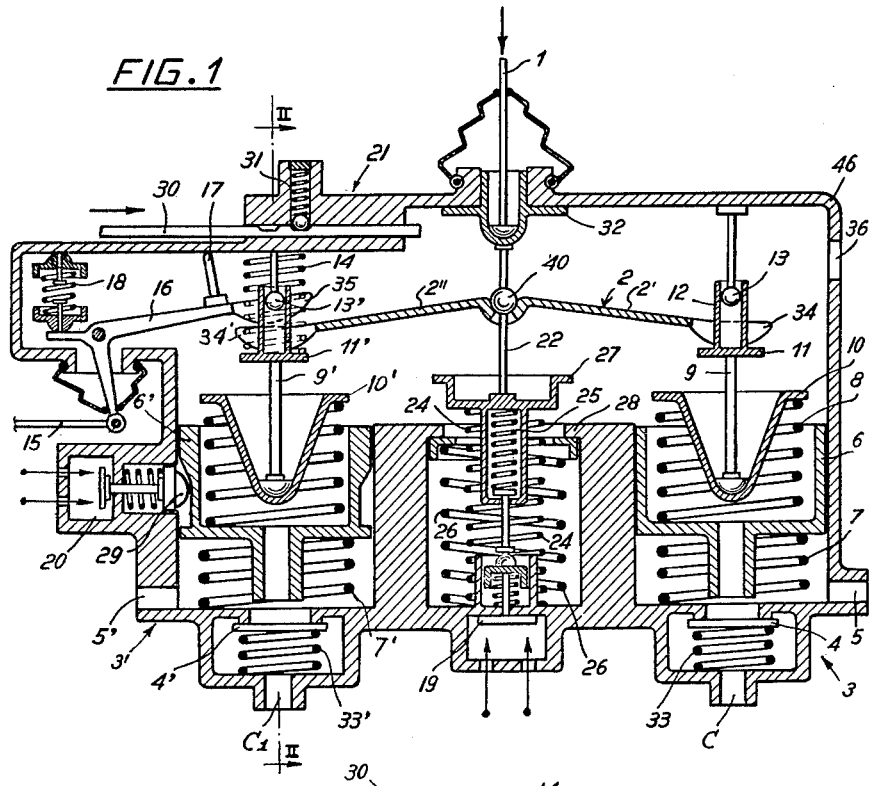

United States Patent Office

3,046,061
Patented July 24, 1962

3,046,061
DUPLEX COMPRESSED AIR DISTRIBUTORS FOR PNEUMATIC BRAKING INSTALLATIONS
Giuseppe Alfieri, Milan, Italy, assignor to Fabbrica Italiana Magneti Marelli S.p.A., Milan, Italy, a firm
Filed May 13, 1960, Ser. No. 29,097
Claims priority, application Italy May 23, 1959
5 Claims. (Cl. 303—53)

This invention relates to duplex compressed-air distributors for pneumatic braking installations for vehicles of the trailer type. The invention particularly relates to those distributors of the type operated by a push rod connected to a brake pedal and employing: a balancing element associated with said push rod for activating two distributor sections, a device associated with the balancing element to anticipate the operation of one section with respect to the other, a device for the manual control of at least one distributing section, and a motor brake switch operated during vehicle motion by the balancing element.

In such devices, the push rod controlled by the brake pedal acts on the balancing element by means of a control spring while the balancing element in turn acts directly on the distributor pistons.

A direct connection of the balancing element arms with the distributor pistons permits excellent performance inasmuch as the two pistons influence each other reciprocally, in the sense that a displacement of one causes a displacement of the other by means of the balancing element.

Independent movement of one or the other of the pistons can actually occur, depending on the different pressure conditions to which they are subjected.

Normally, one piston controls the feeding of a braking section of the vehicle, while the other controls the activation of another section. Because the characteristics of pneumatic installations are almost always different, the result is that the feed pressures are not equal with consequent unequal thrust actions being exerted on the distributor pistons. This is the case where one distributor controls the braking section of a motor vehicle and the other controls the trailer section feeding systems, or to be more precise, the servodistributor mounted on same.

When hand operation of one of the two distributors is required for an auxiliary braking of that part of the vehicle which it controls, the apparatus comprises a further suitable manually controlled device installed in association with the corresponding distributor. This device may comprise a control spring, a return spring, supporting caps for the aforesaid springs, and a control leverage system accessible from the driving seat.

The control action of the distributor to be manually operated is transmitted by the balancing element which activates the distributor during the brake pedal operation phase.

The use of a special device for the hand braking of the section causes the distributor apparatus to be more bulky, complex and costly.

An object of the present invention is to eliminate the above mentioned defects while improving the equilibrium and the sensitivity of the distributors, and at the same time greatly simplifying the anticipating device and the hand braking control device.

A simplex distributor according to the invention is characterized by the fact that the push rod acts directly on the balancing element, which in turn controls each distributing piston by means of a control spring, the action of the balancing element on each spring being transmitted by a push rod having its upper extremity adapted for being guided and allowing the operating arm of the balancing element to rest on the same, the operating push rod of the section to be anticipated being subjected to the action of a preloaded spring, the push rod of the distributor to be manually operated being activated directly by the lever system of the hand control device.

Figure 2:
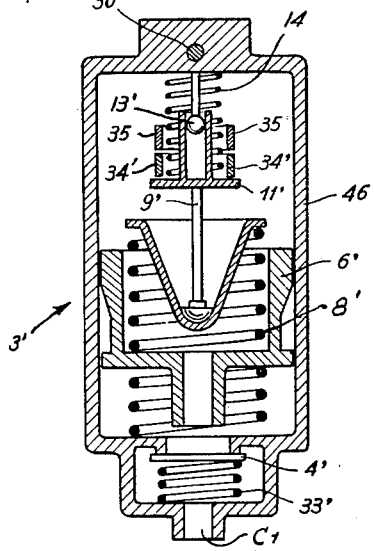

The details of the invention will be described with reference to the attached drawing in which:

FIG. 1 is an elevation view partly in section of a schematic representation of a duplex distributor according to the invention; and FIG. 2 is a sectional view taken along the line II—II in FIG. 1.

In the drawing is shown a casing 46 having an opening 36 to the atmosphere. In the casing is positioned an operating control push rod 1 connected to a brake pedal (not shown), a control balancing element 2 with arms 2' and 2", two distributors 3 and 3' each comprising a compressed air inlet valve 4 and 4', feed pipes 5 and 5' coupled to the braking section, and distributor pistons 6 and 6' with return springs 7 and 7'. By way of example, let it be assumed that distributor 3' controls the trailer braking section.

In this example, let it also be assumed that the braking of the trailer occurs in anticipation (earlier than) of the motor unit, and that the trailer is the part of the vehicle to be braked by the manual device. Hand braking is employed on the trailer in order to obtain a small slowing up of the entire vehicle without pressing on the foot pedal.

According to a first aspect of the invention, the control push rod 1 is directly connected to the hinged balancing element 2 by means of ball 40, while arms 2' and 2" act on the distributor pistons 6 and 6' by means of the respective control springs 8 and 8'.

Equilibrium of the distributor pistons is improved inasmuch as the movements thereof are associated with the corresponding control springs and do not influence the balancing element.

Control by arms 2' and 2" is transmitted to springs 8 and 8' by means of the respective rods 9 and 9' which act on said control springs by means of caps 10 and 10'.

According to a second aspect of the invention, said rods 9 and 9' terminate at their upper extremity with a disc 11 and 11' each fixedly bearing a hollow rod 12 or 12' into which respectively penetrate extensions with spherical extremities 13 and 13' fixed to the body of the apparatus.

The spherical shape of the extremities 13 and 13' permits the hollow rods 12 and 12', and therefore rods 9 and 9', to orient and adapt to the respective caps 10 and 10'.

On discs 11 and 11' rest the extremities 34, 34' of the balancing element arms 2' and 2", these extremities being shaped in the form of a fork with the two prongs arranged around rods 12 and 12'.

A preloaded spring 14 acts on disc 11' of distributor 3'. This spring is assembled concentrically with respect to push rod 12' and on one side rests on disc 11' and on the other side on the body of the apparatus.

The manual control device acts, for example, on the disc of push rod 9' of distributor 3'.

According to the present invention, the above mentioned device constitutes a notable simplification in that it utilizes elements of the distributor already present for its operation.

The use of a control spring permits the device to be reduced to only the control lever system substantially comprising the tie rod 15 accessible from the driving seat, and the lever 16 acts directly on disc 11' of push rod 9' by means of a fork-shaped extremity 35.

A lever stop 17 and a spring 18 protect lever 16, and consequently the entire lever system from vibrations which occur during pedal operation of the distributor as a consequence of the separation of disc 11' from the fork of lever 16.

Completing the apparatus is unit brake device 19, stop switch 20, and end of run control 21.

To control the unit brake switch, balancing element 2 carries fixed on the extension of push rod 1 a rod 22 terminating in a shaped cap 23 which acts as a control spring 24 and the return spring 25 by which switch 19 is controlled. This latter, with springs 24—25 and differential reaction spring 26, constitutes a single assembly mounted in the central part of the apparatus on the same axis as the control push rod 1. Unit brake switch 19 controls a braking device which is independent of the distributors, such as an exhaust brake, which latter will be actuated prior to the braking devices controlled by the distributors.

The operation of spring 26 is well known. Against this spring acts cap 23 after a run of the balancing element corresponding to the braking phase in which only the unit brake intervenes.

The supplementary force caused by spring 26 informs the driver of the opening of the inlet valves 4 and 4', and consequently of the true and proper braking through the intervention of the distributor. The cap also permits limiting of the maximum feed pressure to a desired value.

This is obtained by the effect of the opposition of the raised extremity 27 to the protrusion 28 on the body of the apparatus. In fact, the protrusion by stopping the run of the balancing element limits the maximum feed pressure to the operating load corresponding to the permitted run.

The stop switch 20 is controlled by the distributor piston 6' which acts on the switch operating device 29 by means of a lateral inclined surface.

The stop switch in any event is always controlled by the distributor piston which is subjected to the manual control as well, and this is to assure signalling of the stopping of the vehicle whether in the pedal-braking phase in which both pistons are displaced or in the hand-braking phase in which only one of the two pistons is displaced.

The end of run device is installed in the apparatus to take into account the load conditions of the vehicle during braking. In the case of an unloaded vehicle, it is obvious that a reduced pressure is sufficient such as, for example, 3 atmospheres. Increased pressure values are required for different load conditions.

Pressure control is obtained by means of rod 30 which, when brought under the stop catch 32 of push rod 1, and held there by positioning spring 31, permits the arresting of the run of the push rod in the position corresponding to the minimum predetermined pressure value.

The operation of the apparatus is as follows: during braking operations, the control push rod 1, as a result of depression of the foot pedal, moves the balancing element, which acts on the distributor pistons 6 and 6' by means of rods 9 and 9' and springs 8 and 8'. As a result, the inlet valves 4 and 4' are displaced to compress return springs 33, and 33' and the compressed air from chambers C and C', which are connected to the air reservoir tank (not shown), flows through conduits 5 and 5' to the braking sections. Distributor 3' goes into action first, being subjected to the action of preloaded spring 14.

During hand operation of the apparatus, only piston 6' is displaced, causing the opening of feed valve 4' of the trailer section.

During this phase the arm of the balancing element subjected to the control of lever 16 can rotate freely from this side inasmuch as the opposite arm 2' can rise from disc 11 on which it rests.

In the release phase, valve 4 and/or valve 4' close under the action of springs 33 and 33' and the compressed air flows through the internal conduits of one or both the distributing pistons to discharge into the outer atmosphere.

What is claimed is:

1. Apparatus comprising two parallel distributors including parallel pistons and valve members operatively disposed with respect to said pistons to be displaced thereby, a balancing member including two arms each associated with one of said pistons, disks displaceable by said arms, rods on said disks, caps each associated with a respective piston and engaged by one of said rods for being displaced thereby, springs between said caps and pistons, springs engaging said pistons and urging the same against said caps, spherical stops operatively positioned for engaging said disks to constitute a guide therefor to limit movement of the same, a push rod pivotally connected to said balancing member between said arms to displace the same, elastic means engaging one of said disks and urging the rod thereon into contact with the associated cap such that displacement of said push rod causes anticipatory displacement of said associated cap and the corresponding piston whereby advanced operation of the valve member associated with said piston is obtained, a manually pivotal rod, a lever system coupled to and actuated by said rod and adapted to engage and displace said one disk, means operatively coupled to the lever system to limit displacement thereof, and means engaging said push rod to limit displacement thereof.

2. Apparatus as claimed in claim 1 wherein the elastic means engaging one of the disks is constituted by a spring.

3. Apparatus as claimed in claim 2 wherein the spring engaging said one disk is weaker than the spring between the corresponding cap and piston such that the latter piston is normally spaced from the associated valve member.

4. Apparatus as claimed in claim 1 comprising hollow rods on said disks and encircling said spherical stops whereby relative positioning between the hollow rods and the spherical stops is limited.

5. Apparatus as claimed in claim 4 wherein said hollow rods are substantially in axial alignment with the pistons, the elastic means engaging one of the disks being constituted by a spring which is coaxial with the associated hollow rod.

References Cited in the file of this patent

FOREIGN PATENTS

| 713,107 | Germany | Oct. 31, 1941 |
| 813,001 | Great Britain | May 6, 1959 |
| 315,375 | Italy | Feb. 23, 1934 |